United States Patent [19]
Gervais et al.

[11] Patent Number: 5,856,974
[45] Date of Patent: Jan. 5, 1999

[54] INTERNETWORK ADDRESS MAPPING GATEWAY

[75] Inventors: Joseph L. Gervais, Fremont; Alampoondi E. Natarajan; Michael D. Allen, both of San Jose, all of Calif.; Radia J. Perlman, Acton, Mass.

[73] Assignee: Novell, Inc., Orem, Utah

[21] Appl. No.: 600,773

[22] Filed: Feb. 13, 1996

[51] Int. Cl.$^6$ .................................................. H04L 12/66
[52] U.S. Cl. .......................... 370/392; 370/401; 370/475
[58] Field of Search ................................. 370/389, 390, 370/392, 393, 400, 401, 466, 402, 467, 404, 471, 405, 475, 409; 395/200.01, 200.02, 200.03, 200.16, 200.2, 410, 412, 415, 416, 421.11, 200.48, 200.53, 200.6, 200.68, 200.75, 200.79

[56] References Cited

U.S. PATENT DOCUMENTS

| | | | |
|---|---|---|---|
| 4,933,937 | 6/1990 | Konishi | 370/404 |
| 4,933,938 | 6/1990 | Sheehy | 370/401 |
| 5,150,464 | 9/1992 | Sidhu et al. | 395/200.1 |
| 5,159,592 | 10/1992 | Perkins | 370/388 |
| 5,163,045 | 11/1992 | Caram et al. | 370/409 |
| 5,249,181 | 9/1993 | Wang et al. | 370/409 |
| 5,313,465 | 5/1994 | Perlman et al. | 370/254 |
| 5,390,173 | 2/1995 | Spinney et al. | 370/401 |
| 5,428,615 | 6/1995 | Backes et al. | 370/392 |
| 5,442,633 | 8/1995 | Perkins et al. | 370/331 |
| 5,636,216 | 6/1997 | Fox et al. | 370/402 |

OTHER PUBLICATIONS

Apple Computer, "Appletalk Update–Based Routing Protocol: Enhanced Appletalk Routing", Aug. 1993, pp. 1–50.

Primary Examiner—Chi H. Pham
Assistant Examiner—Kwang B. Yao
Attorney, Agent, or Firm—Cesari and McKenna, LLP

[57] ABSTRACT

The present invention is an address mapping gateway, used in an internetwork link, that associates all nodes in a domain with a single network number (referred to as a domain network address), and provides gateway-mapped node addresses that are unique within the domain. The address mapping gateway dynamically substitutes the "globally-unique" domain network address and the "domain-unique" gateway-mapped node address for a network number and node address, respectively, of a network layer address of a packet header received from a source node in the domain. Conversely, when a packet is received for a destination node in the domain, the address mapping gateway substitutes the originally-assigned network number and node address for the domain network address and gateway-mapped node address, respectively, prior to forwarding the packet to the node. Specifically, the address mapping gateway maintains an address mapping table that provides a cross-reference between (1) a source node address and the network number of the local network in which the node resides, and (2) a gateway-mapped node address generated by the address mapping gateway. Upon receipt of a packet from the source node, the address mapping gateway creates a mapping entry in the address mapping table that node and performs an address translation to a globally-unique network layer address. On the other hand, upon receipt of a packet destined for a destination node in the domain, the address mapping gateway locates the mapping entry for the packet's gateway-mapped node address and performs a reverse address translation to the originally-assigned network layer address.

14 Claims, 6 Drawing Sheets

INTERNETWORK ADDRESS MAPPING GATEWAY

BACKGROUND OF THE INVENTION

1. Field of the Invention

The present invention relates generally to computer networks and, more particularly, to routing packets in an internetwork.

2. Description of the Related Art

Internetworking is the process of establishing and maintaining communications and transferring data among multiple local networks in a distributed network system. The purpose of an internetwork is to provide end-to-end service between one user (a source node) and another user (a destination node).

Figure 1:
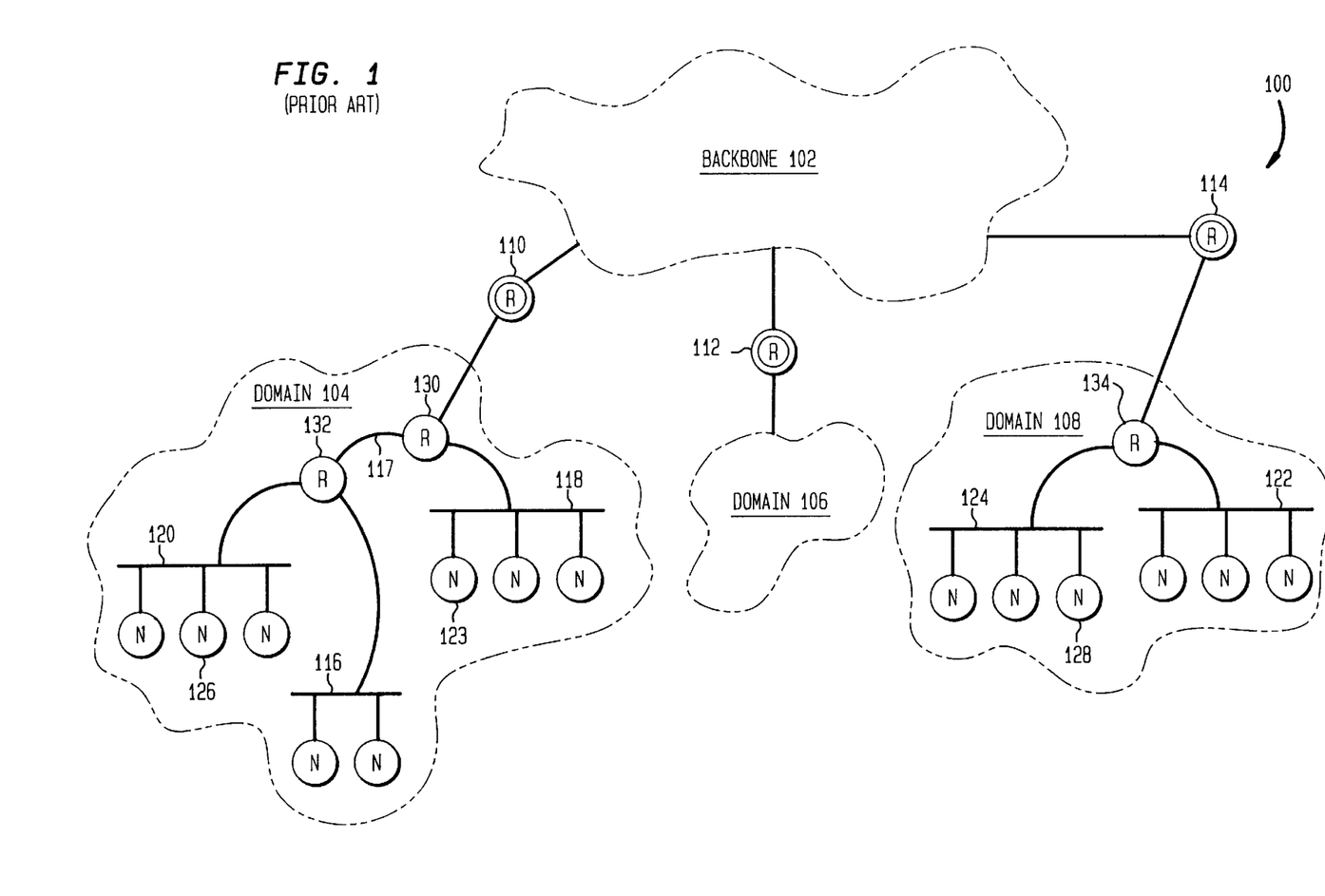
FIG. 1 is a block diagram of a computer internetwork including a collection of domains having one or more local networks.

FIG. 1 depicts an exemplary embodiment of an internetwork system 100, comprising a plurality of routing domains 104–108 coupled to a backbone network 102. In the hierarchically-arranged distributed internetwork system 100, backbone 102 is the top-level, or central, connection path shared by the nodes and networks connected to it, managing the bulk of the traffic between communicating nodes.

Each routing domain 104–108 is a collection of routers that are part of a larger network, such as internetwork 100. Routing domains are also referred to as customer networks or autonomous systems. Domains 104–108 are connected to the backbone 102 through nodes referred to as routers 110, 112 and 114, respectively.

Each routing domain is a collection of one or more local networks, such as local area networks (LAN), metropolitan area networks (MAN), wide area networks (WAN), etc., that are attached to the backbone through one or more routers. In the following discussion, the term "local network" shall be used to refer to all types of networks that may be included in a domain. For example, domain 104 includes local networks 116, 118, and 120. A local network is depicted as a line to which stations can be attached. If a station, or end node, attaches to the bold line, it can transmit packets to, and receive packets from, every other station attached to that same bold line. The source and destination nodes are, typically, computers (workstations and servers) but may be any type of device that can include a network interface card (NIC), such as a printer or modem. Each domain may contain intradomain routers for managing communications among local networks within a particular domain. The routers within a routing domain communicate with each other using a common intradomain routing protocol, such as Routing Information Protocol (RIP) and Integrated IS-IS (Intermediate System-to-Intermediate System) protocols.

In order to reduce design complexity, most networks are organized as a series of hardware and software levels or "layers" within each node. These layers interact to format data for transfer between, for example, a source node and a destination node communicating over the network. Specifically, predetermined services are performed on the data as it passes through each layer and the layers communicate with each other by means of predefined protocols. This layered design permits each layer to offer selected services to other layers using a standardized interface that shields those layers from the actual implementation details of the services.

In an attempt to standardize network architectures, that is, the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

Figure 2:
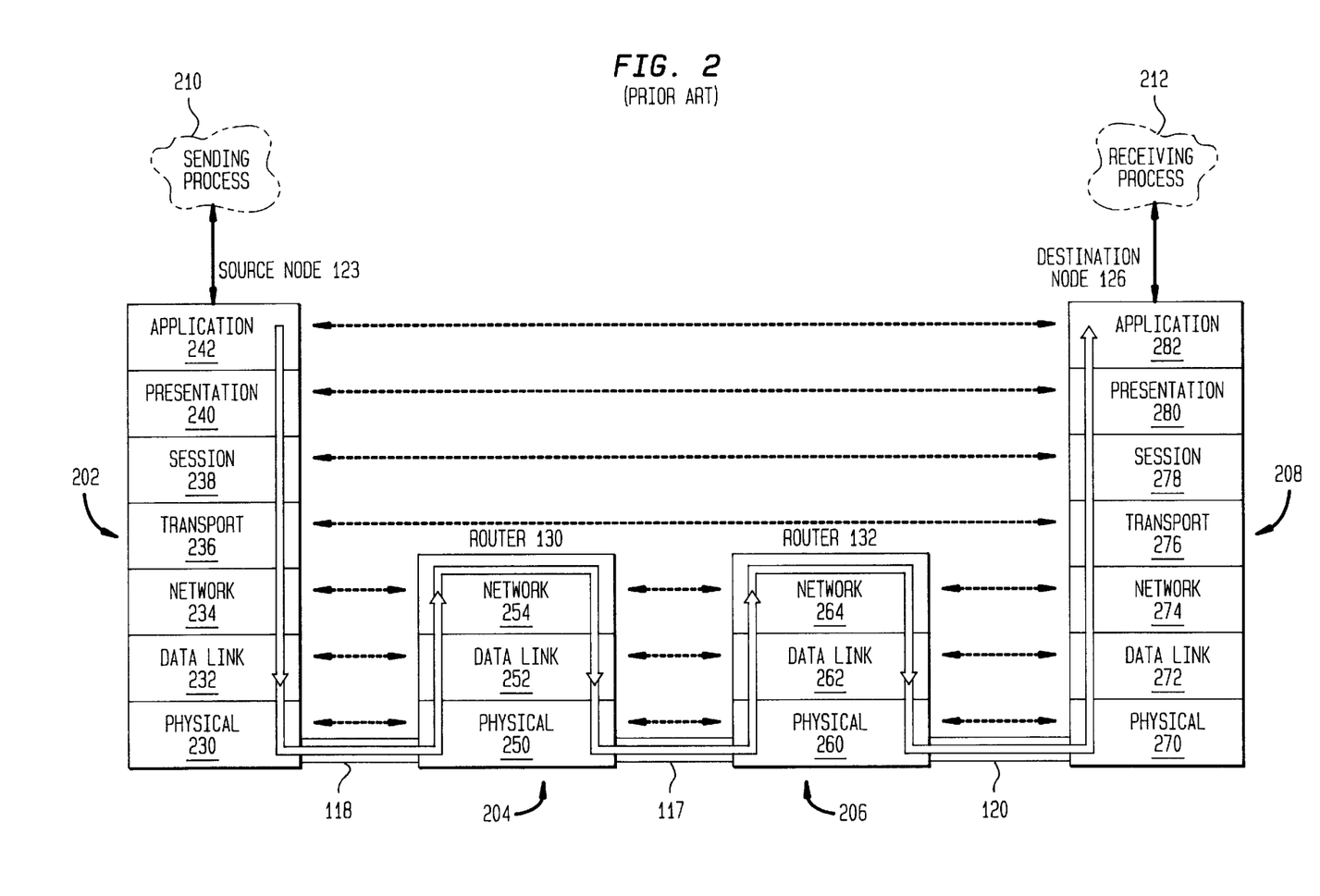
FIG. 2 is a schematic block diagram of prior art protocol stacks used to transmit data between a source node and a destination node of a computer network.

FIG. 2 illustrates a schematic block diagram of OSI protocol stacks 202–208 used to transmit data between, for example, a source node 123 and a destination node 126 through routers 130 and 132, all of which are elements of internetwork 100. Each protocol stack is structured according to the OSI seven-layer model; accordingly, each stack comprises a collection of protocols, one per layer. The routers will make use of the lower three OSI layers, known as the subnet layers, to move the data along to the next router or the destination node. As can be seen, the protocol stacks 202–208 are physically connected through communications channels 118 at physical layers 230–250; 117 at physical layers 250–260; and 120 at physical layers 260–270. Data flow is schematically illustrated by solid arrows. For ease of description, the protocol stack 202 will be described.

Broadly stated, the physical layer 230 transmits a raw data bit stream over a communication channel 118, while the data link layer 232 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The network layer 234 routes data packets from the source node 123 to the destination node 126 by selecting one of many alternative paths through the physical network. The transport layer 236 accepts the datastream from the session layer 238, apportions it into smaller units (if necessary), passes the smaller units to the network layer 234 and provides appropriate mechanisms to ensure that all the units arrive correctly at the destination node.

The session layer 238 establishes data transfer "sessions" between software processes on the source and destination nodes, along with management of such sessions in an orderly fashion. That is, a session not only allows ordinary data transport between the nodes, but it also provides enhanced services in some applications. The presentation layer 240 performs frequently-requested functions relating to the presentation of transmitted data, including encoding of data into standard formats, while the application layer 242 contains a variety of protocols that are commonly needed by processes executing on the nodes.

Data transmission over the internetwork 100 therefore consists of generating data in, for example, a sending process 210 executing on the source node 123, passing that data to the application layer 242 and down through the layers of the protocol stack 202, where the data are sequentially formatted as a packet for delivery onto the channel 118 as bits. Those packet bits are then transmitted to the protocol stacks 204 and 206 of the routers 130 and 132, respectively, and finally to stack 208 of the destination node 126, where they are passed up that stack to a receiving process 212.

Although actual data transmission occurs vertically through the stacks, each layer is programmed as though such transmission were horizontal. That is, each layer in the source node 123 is programmed to transmit data to its peer layer in the destination node 126, as schematically shown by dashed arrows in FIG. 2. To achieve this effect, each layer of the protocol stack 202 in the source node 123 typically adds information (in the form of a header field) to the data packet generated by the sending process as the packet descends the stack. At the destination node 126, the various headers are stripped off one-by-one as the packet propagates up the layers of protocol stack 208 until it arrives at the receiving process 212.

The source and destination network layer addresses are typically hierarchical and consist of a plurality of elements, including a network number and a node address. Within each local network, each node has a unique node address that identifies a particular node in a particular local network. The node address is also known as a node ID or node number.

In addition to a unique node address, each node in a local network has a common network number. Within each domain, routing is based on this network number and, therefore, these numbers are assigned so that they are unique within each particular local network. That is, the network numbers are arbitrary values that are assigned identically to each node in a local network. Routers 110–114 (FIG. 1) "advertise" to the backbone the network numbers in their domain networks that they can access. A network number is also referred to as a local network number or Internetwork Packet Exchange™ (IPX™) network number. The network layer address, which includes both the network number and the node address, is also referred to as the local network address or IPX network address.

Presently, in order to support end-to-end connectionless communications between all nodes in an internetwork, every local network must have a unique network number to distinguish the nodes in that network from other nodes in other local networks in the internetwork. Thus, no two local networks in an entire internetwork may have the same network number.

However, there has been no global enforcement regarding the assignment of network numbers to local networks, resulting in arbitrarily-assigned network number values within an internetwork. Accordingly, as the number of local networks in the internetwork increases, so does the incidence of conflicting network layer addresses due to the assignment of non-unique network numbers. This phenomenon results in address collisions, adversely affecting the ability of the internetwork to reliably route packets to a particular destination node.

In addition, in recent times, the size of internetworks has increased dramatically, placing a burden on routers to support large numbers of local networks. For example, some routers perform route aggregation as a technique for summarizing a large quantity of network numbers by associating them with a particular domain, enabling an implementing router to identify a range of network numbers with a relatively small amount of information. Oftentimes however, conventional routing protocols such as IPX RIP do not support route aggregation. Thus, in order to provide the ability to communicate with every node, the backbone must allocate resources for storing and retrieving every network number for every local network in the internetwork.

Although some routing protocols such as IS-IS and NetWare® Link Services Protocol™ (NLSP™) software implement some form of aggregation, such protocols still suffer from the above drawback of being unable to properly identify local networks when non-unique network numbers exist. Furthermore, although aggregation may be possible, oftentimes the manner in which the network numbers are assigned does not necessarily lend itself to summarization.

One conventional approach to ensuring that all local networks have a unique network number has been to require all nodes in a local network to change the network number associated with that local network prior to connecting to the internetwork. One drawback to this approach is that the routers must be reconfigured to support these new network numbers. In addition, once all the local networks in the internetwork have a globally-unique network number, the backbone must still provide the resources necessary to maintain the large number of network numbers in the internetwork. Furthermore, routers that cannot aggregate are incapable of servicing the resulting large number of network numbers.

In order to maintain unique network layer addresses in an internetwork having local networks with redundant network numbers, some routing protocols, such as AURP (AppleTalk® Update Routing Protocol) of the AppleTalk Protocol Suite, provide a unique network number for every local network in the internetwork. This information, typically maintained as part of the routing table, simply provides a one-to-one mapping of a non-unique network number to a unique network number. Although these types of protocols result in a unique network number for each local network, they do not address the inability of certain routers to support the large number of network numbers that must be addressed by the router. In other words, a router unable to support the large number of potentially non-unique network numbers will also be unable to support the same number of globally-unique network numbers. Furthermore, conflicts often arise between the new network number and certain upper-layer protocols that are sensitive to address changes.

Another conventional approach is to expand the address space of nodes coupled to the internetwork to provide new and modified elements to a conventional hierarchical network layer address. This approach is described in pending U.S. patent application Ser. No. 08/499,103, entitled "Network Addressing Arrangement For Backward Compatible Routing of an Expandable Address Space," naming as inventors Radia J. Perlman and Neal D. Castagnoli, filed on Jul. 6, 1995, and assigned to the assignee of the present invention. However, this approach requires time consuming and costly upgrading of all nodes in a domain to support this expanded address space.

What is needed, therefore, is a means for providing addressing information to reliably route communications among local networks of an internetwork in a manner that is not adversely affected by redundant network numbers and that does not require large amounts of addressing information to be maintained by the backbone or routers.

SUMMARY OF THE INVENTION

The present invention is an address mapping gateway, used in an internetwork link, that associates all nodes in a domain with a single network number (referred to as a domain network address), and for providing a gateway-mapped node address that is unique within the domain. The address mapping gateway dynamically substitutes the "globally-unique" domain network address and a "domain-unique" gateway-mapped node address for a network number and node address, respectively, of a network layer address of a packet header received from a source node in the domain. Conversely, when a packet is received for a destination node in the domain, the address mapping gateway substitutes the originally-assigned network number and node address for the domain network address and gateway-mapped node address, respectively, prior to forwarding the packet to the node.

Specifically, the address mapping gateway maintains an address mapping table that provides a cross-reference between (1) a source node address and the network number of the local network in which the node resides, and (2) a gateway-mapped node address generated by the address mapping gateway. Upon receipt of a packet from the source node, the address mapping gateway creates a mapping entry in the address mapping table and performs an address translation to a globally-unique network layer address. On the other hand, upon receipt of a packet destined for a destination node in the domain, the address mapping gateway locates the mapping entry for the packet's gateway-mapped node address and performs a reverse address translation to the originally-assigned network layer address.

When the node address is recognized as one that is assigned by a global authority (e.g., IEEE) and is therefore globally-unique, the gateway-mapped node address is assigned a value that is identical to the node address. However, if the node address appears instead to have been locally-assigned rather than obtained from the global authority, the address mapping gateway generates a gateway-mapped node address value that is unique within the domain network address; this novel translation operates to replace the potentially duplicative node address.

A translation exemption table containing non-translatable network numbers is maintained by the gateway and referenced so as to prevent translation of certain local network addresses that must be made available to the backbone. Rather than translating addresses of nodes on the non-translatable network number, the address mapping gateway explicitly advertises these non-translatable network numbers.

In an embodiment of the invention, an address mapping gateway may reside within a domain accessible through multiple address mapping gateways. Here, when an address mapping gateway receives a packet having the domain network address as the network number and a node address for which there is no mapping entry in its address mapping table, the gateway forwards the packet to the other address mapping gateways associated with the domain in which the destination node is located. The gateway having the mapping entry for the packet's node address performs the above-noted address translation, forwards the packet to the destination node, and provides the mapping entry information to the gateway sending the packet for future use.

According to the principles of the present invention, mapping substantially all local network addresses in a domain to a single domain network address enhances routing efficiency by substantially reducing the amount of addressing information associated with a domain. The routers and backbone must simply consider only the unique domain network address, eliminating the need for the backbone to maintain a different network number for each local network in the internetwork. Thus, the backbone need not be provided with, nor retain, information regarding each local network included in a domain.

Furthermore, translation of the network layer address occurs in a manner that is transparent to the backbone, routers, and nodes in the domain. This enables the address mapping gateway to generate unique network layer addresses without requiring modification of the end nodes or the backbone, thereby making the implementation of the invention simple and cost effective. This feature of the invention enables addressing to be compatible with any intradomain and interdomain routing protocol.

As a further advantage of the invention, the originally-assigned network numbers of the domain nodes are not visible to the backbone, thereby providing end-to-end communications throughout the internetwork despite possible conflict between a domain having local networks with network numbers that conflict and other local networks' nodes in the backbone.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

For a fuller understanding of the nature of the invention, reference should be made to the following detailed description taken in connection with the accompanying drawings, in which.

DETAILED DESCRIPTION OF THE PREFERRED EMBODIMENTS

Figure 3:
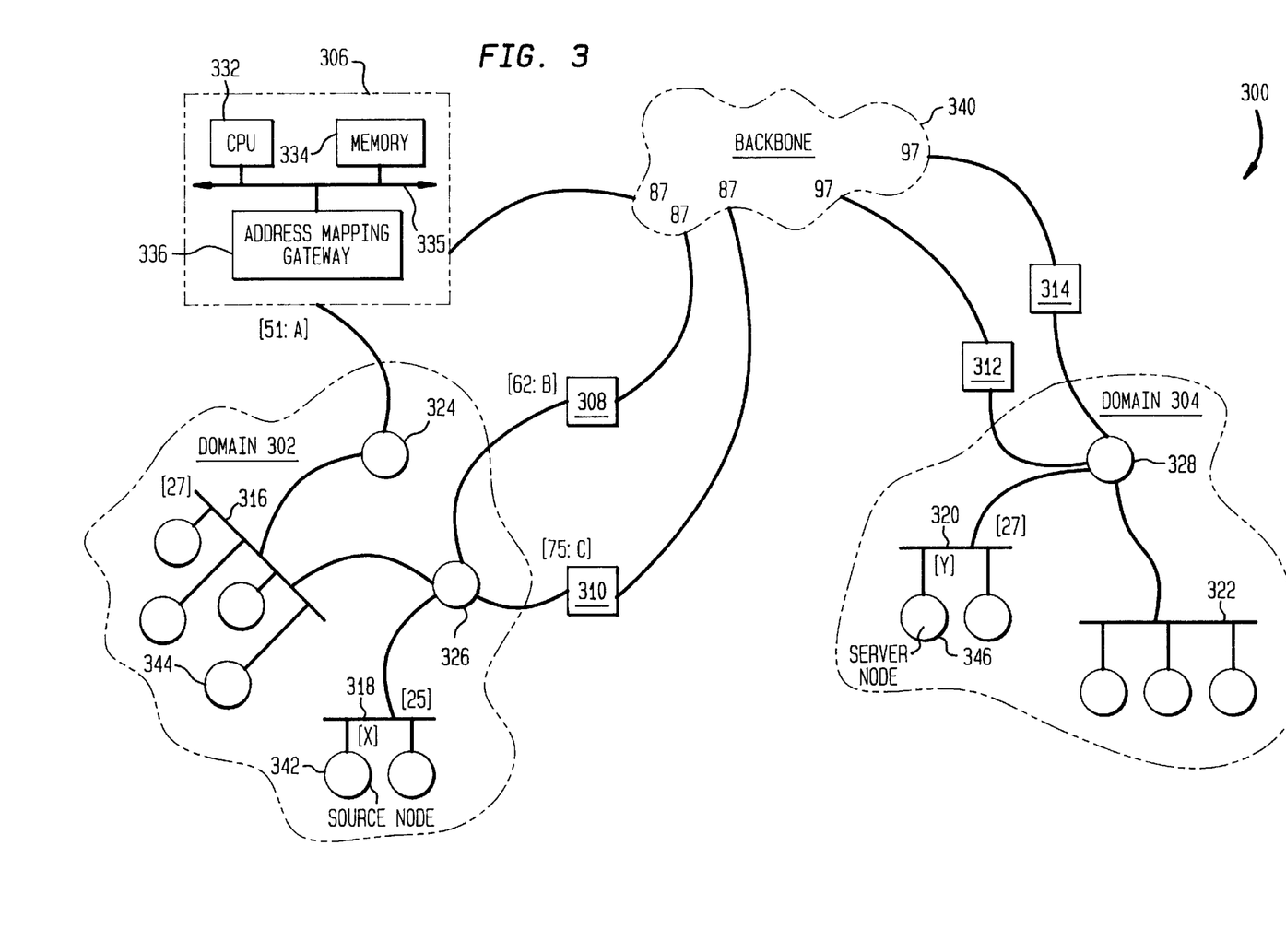
FIG. 3 is a block diagram of a computer internetwork including a collection of domains connected to a backbone via one or more address mapping gateways of the present invention.

FIG. 3 is a block diagram of an internetwork system 300 comprising a collection of domains 302–304 containing a number of local computer networks 316–322, each having one or more nodes, such as workstations and servers. The local networks are connected by intermediate nodes, such as intradomain routers 324–328 and interdomain routers 306–314 implementing the address mapping gateway of the present invention.

The routers are typically general-purpose computers, comprising a central processing unit (CPU) 332, a memory unit 334 and an address mapping gateway 336 of the present invention, interconnected by a system bus 335. The memory unit 334 may comprise storage locations typically composed of random access memory (RAM) devices, which are addressable by the CPU 332 and address mapping gateway 336. An operating system, portions of which are typically resident in memory and executed by the CPU 332, functionally organizes the node by, among other things, invoking network operations in support of processes executing in the CPU.

The routers may operate with network layer protocols such as the connectionless network layer protocol (CLNP)

and the Internet Protocol (IP) network layer protocol; however, in the illustrative embodiment described herein, the network layer protocol is preferably the Internetwork Packet Exchange (IPX) protocol.

Figure 4:
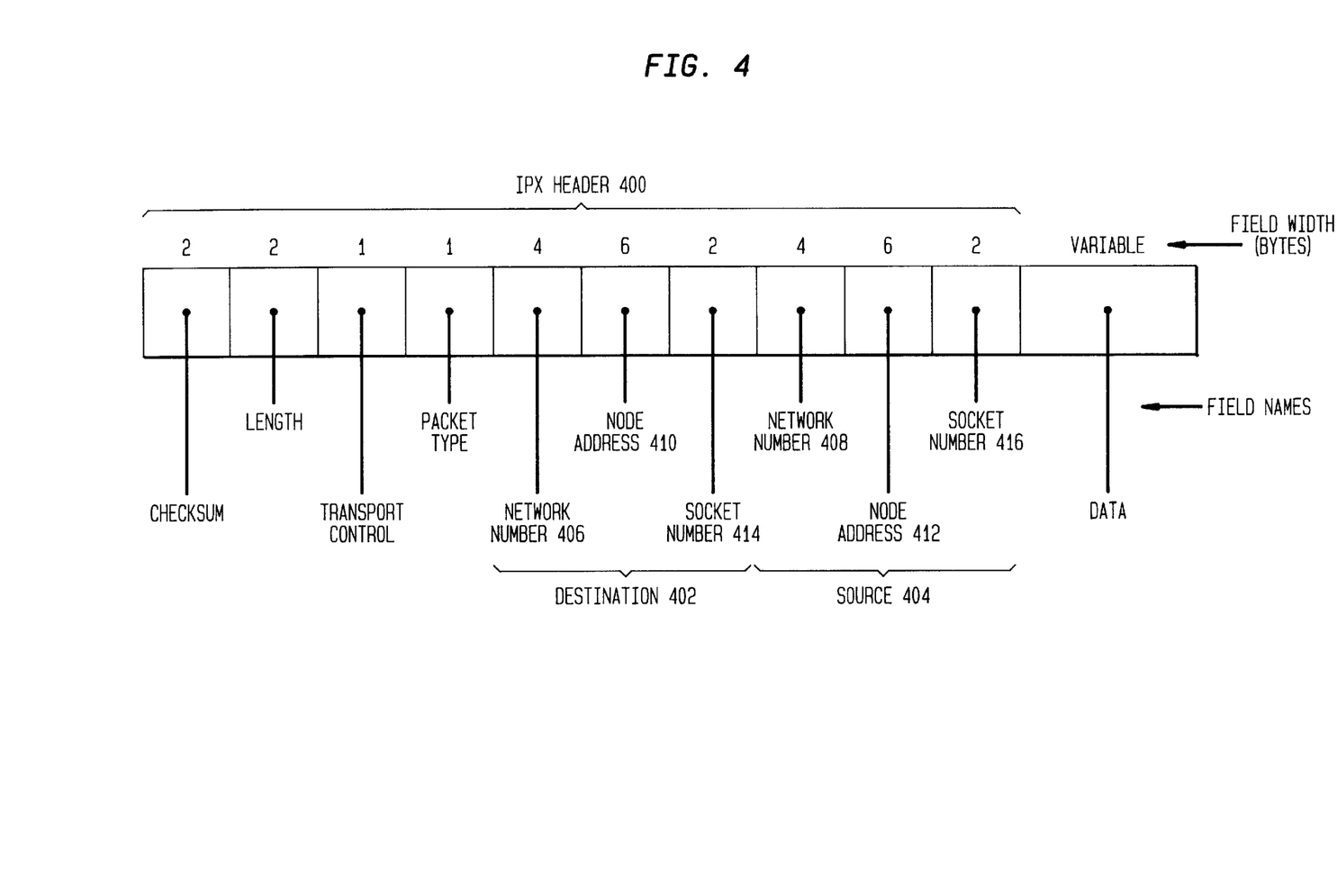
FIG. 4 is a schematic diagram depicting the format of a conventional IPX network layer header.

As noted, when the network layer receives a packet from the transport layer for transmission over the network, it adds a network layer header. FIG. 4 depicts a standard header 400 for the preferred IPX address. Particularly, header 400 contains a destination address field 402 and a source address field 404, each containing fixed-length, hierarchical network layer addresses.

The network layer address is a three-part, 12-byte hierarchical address (each byte having 8 bits). Accordingly, in the IPX header 400 the source and destination address fields 404 and 402, respectively consist of a plurality of hierarchical elements, including a 4-byte network number field 406, 408; a 6-byte node address field 410, 412; and a 2-byte socket number field 414, 416, respectively. As noted, within each domain, routing is based on the 4-byte network number that identifies a local network within the domain, and the 6-byte node address that identifies a particular node in that local network.

The network layer address is oftentimes described as including all three of the above addressing elements. However, for purposes of the present discussion, the term "network layer address" refers to the first two entities; that is, the network number and node address. Thus, the network layer address for a node on the internetwork 300 may be represented by the shorthand notation: "Net:ID" wherein "Net" refers to the network number and "ID" refers to the node address.

Referring to FIG. 3, for example, local network 316 has a network number of 27 while local network 318 has a network number of 25. Source node 342 in local network 318 has a node address of X. Thus, the network layer address (net:id) for node 342 is 25:X. Likewise, the network layer address (net:id) of server node 346 is 27:Y. All the nodes on that local network share the same 4-byte network number that specifies which local network includes the node. For example, all nodes in local network 320 are assigned the same network number of 27, with each having a different node address (id).

A domain may have access to the backbone 340 through more than one router for various reasons such as load sharing. Each router implementing the address mapping gateway 336 of the present invention advertises the same network number value to the backbone as the network number assigned to all nodes in the domain, mapping substantially all network numbers in that domain to that single network number, referred to as a domain network address.

The address mapping gateway 336 performs address translation functions to represent substantially all the nodes in a domain as being associated with the domain network address. The address mapping gateway performs the translation functions on the source and destination network layer addresses as packets are routed between the domain and backbone network.

Generally, the address mapping gateway dynamically substitutes the globally-unique domain network address and domain-unique gateway-mapped node address for a source network number and node address of a network layer address in a packet received from a node in the domain. When a packet is received for a destination node in the domain, the address mapping gateway performs a reverse translation on the destination network layer address, after which the packet is forwarded to the node.

Figure 5:
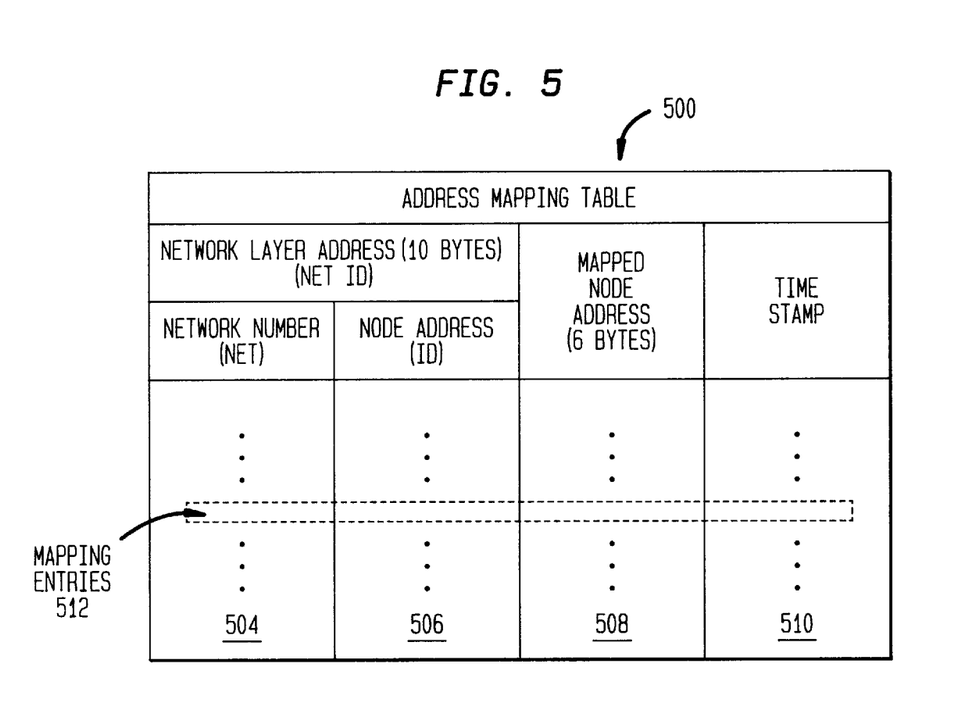
FIG. 5 is a block diagram of the address mapping gateway address mapping table of the present invention.

Referring to FIG. 5, the address mapping gateway 336 maintains an address mapping table 500 that provides a cross reference between (1) the originally-assigned node address of a domain node and the network number of the local network in which the node resides and (2) a gateway-mapped node address generated by the address mapping gateway. Each mapping entry 512 in the table 500 has a network number field 504 and node address field 506, together comprising a network layer address (net:id). Table 500 further includes a 6-byte gateway-mapped node address field 508 that includes a domain-unique node address generated by the address mapping gateway. The address mapping table 500 also includes a time stamp field 510.

Upon receipt of a packet from the source node 342, the address mapping gateway 336 creates a mapping entry 512 in the address mapping table 500 for the source node address and the associated local network's network number. The address mapping gateway 336 also creates a gateway-mapped node address as described in detail below, which is stored in mapped node address field 508.

The address mapping gateway 336 dynamically substitutes the globally-unique domain network address of the domain in which the node resides in place of the network number in the source address field of the packet header. The address mapping gateway also substitutes the associated gateway-mapped node address for the originally-assigned node address, also located in the source address field.

Upon receipt of a packet for a destination node in the domain, the address mapping gateway 336, using the gateway-mapped node address stored in the destination node address field 410, retrieves the network layer address associated with the gateway-mapped node address from address mapping table 500. The address mapping gateway then substitutes the retrieved network layer address, including the network number and node address, in place of the domain network address and gateway-mapped node address, and forwards the packet to the destination node.

In the preferred embodiment, the address mapping table 500 contains a time stamp field 510 indicating the time at which the mapping entry was last accessed. This enables the address mapping gateway to determine the age of the mapping entry so that the least recently used mapping entries can be discarded as they become dated or as otherwise needed. The address mapping table 500 is stored in any common memory device, such as memory 334.

The use and operation of the address mapping table 500 is described below with reference to address mapping gateway 336 and source node 342. Upon receipt of a packet from source node 342 having a source node address of X, the gateway 336 creates a mapping entry 512 in the address mapping table 500 for the source node address (X) and the associated local network's network number (25). The mapping entry also includes a gateway-mapped node address Z (discussed below) that may have a value that is the same or different than the originally-assigned node address value, and a time stamp at which the mapping entry was created.

The gateway 336 then dynamically substitutes the globally-unique domain network address of 87 for domain 302 in place of the network number 25 in the source address field 404 of header 400. Thus, the network layer address for the packet as it enters backbone 320 is 87:Z.

Upon receipt of a "return" packet for source node 342 in domain 302, the address mapping gateway 336 searches the mapped node address fields 508 for the gateway-mapped node address Z stored in destination node address field 410 to retrieve the associated network layer address. Once the mapping entry for node 342 is located, the address mapping gateway retrieves the network number (25) and the associated destination node address (X) from the address mapping table 500.

The gateway 336 then dynamically substitutes the network number 25 for the globally-unique domain network address (87) in the destination network number field 406. The gateway also substitutes the node address (X) for the mapped node address (Z) in the destination node address field 410. Thus, the packet is forwarded to the destination node with a network layer address of 25:X. Intradomain router 326 will then receive and forward the packet to the destination node 342.

It should be noted that whenever an IPX header is changed, it needs to be checked to see if checksums were enabled on the packet (a value other than FFFF). It they were, a new checksum needs to be calculated before the packet is retransmitted.

Mapping substantially all local network addresses in a domain to a single domain network address enhances routing efficiency by substantially reducing the amount of addressing information associated with each network in a domain. The routers and backbone must simply consider only the unique domain network address, eliminating the need for the backbone to maintain a different network number for each local network in the internetwork. Thus, the backbone does not need to be provided with, nor retain, information regarding each local network included in a domain.

Furthermore, the address mapping gateway translates the network layer address in a manner that is transparent to the backbone, routers, and nodes in the domain. This enables the address mapping gateway to generate unique network layer addresses without requiring modification of the end nodes or the backbone, thereby making the implementation of the invention simple and cost effective. This also enables the addressing to be compatible with any intradomain and interdomain routing protocol.

As noted, the node address is unique within the network number (within the local network), and because the node address is typically assigned by the global authority (IEEE), the node address is oftentimes globally-unique within the entire internetwork 300. However, a node address that has been assigned locally (by the local network owner, for example) rather than obtained from the global authority is not necessarily unique within the domain. Typically, under such circumstances, as nodes are added to the local network the node addresses are dynamically assigned in sequential order, beginning at the number one. Applications that generate a local node address, include, for example, NetWare Mobile IPX™ software and the NetWare Connect™ software.

If more than one local network includes nodes for which the node addresses were locally assigned, it is likely that duplicative node addresses will exist within the domain. Such duplicative node addresses prevent the address mapping gateway 336 from always doing a direct mapping of the node address to create a unique gateway-mapped node address.

The address mapping gateway of the present invention generates a gateway-mapped node address that is guaranteed to be unique within the internetwork. Generally, the address mapping gateway sets the gateway-mapped node address equal to the originally-assigned node address when the address mapping gateway determines that the node address was assigned by the global authority. This is because the global authority guarantees that the assigned node address is globally-unique. On the other hand, when the node address is locally assigned, the address mapping gateway implements a compensatory addressing scheme to generate a gateway-mapped node address to replace the potentially duplicative node address with a value that is unique within the domain.

Figure 6:
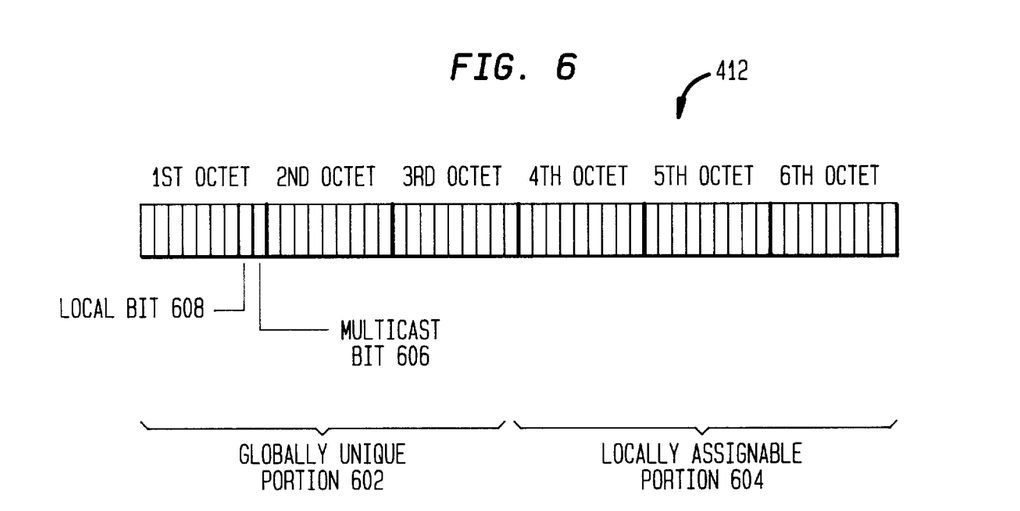
FIG. 6 is a block diagram of a 6-byte source or destination address field of a conventional IPX network layer header.

FIG. 6 illustrates node addresses 410 and 412 in greater detail. To enable nodes to be provided with a globally-unique identifier at the time of manufacture, as well as to enable local network owners to assign node addresses, the IEEE established the 6-byte (48-bit) node address field 410 consisting of two 3-octet portions: a globally-unique portion 602 and a locally assignable portion 604. The globally-unique portion 602 is known as an OUI (Organizational Unique Identifier) provided by the IEEE and the remaining portion 604 is assignable by the owner of the OUI.

Within the three fixed-value octets, there are two bits that are not used to convey node address type information. An IEEE local bit 608 indicates whether the node address refers to a globally-assigned address (value of 0) or whether it is locally-assigned (value of 1). An IEEE multicast bit 606 indicates whether the node address is a unicast address (value of 0) or a multicast address (value of 1). Thus, the global authority does not actually provide 24-bits of fixed value, but rather 22-bits of fixed value, with the remaining bits being the multicast bit 606 and the local bit 608.

The address mapping gateway 336 determines whether the node address is a locally-assigned or globally-assigned node address based upon the contents of the globally-unique portion 602 of the node address field 412. If the field (excluding the IEEE multicast and local bits 606, 608) has bits that are set, then it is assumed that the node address is a globally-assigned node address, and the gateway-mapped node address is set to the value contained in the node address field 412. Otherwise, the node address is assumed to be a locally-assigned node address, and the gateway-mapped node address is determined as explained below.

Specifically, in the preferred embodiment of the present invention, if the originally-assigned node address has a value that is it greater than 16,383 (that is, has a value that is greater than 14 bits in length ($2^{14}-1=16,383$)), it is considered to be a globally-assigned node address. Significantly, as noted, the locally-assigned node addresses are generated sequentially from the number one and are thus generally small numbers, with the maximum value being no greater than the total number of nodes in the local network.

The gateway-mapped node address that is generated to replace the potentially non-unique locally-assigned node address is described below with reference to FIG. 7. Since the locally-assigned node address is unique within the local network, and since the network number of the local network is unique within the domain, the address mapping gateway 336 combines these values to create a gateway-mapped node address that is guaranteed to be unique within the domain. The address mapping gateway places this value in the mapped node address field 508 of address mapping table 500. It also replaces the originally-assigned node address in source node address field 412 with the gateway-mapped node address.

Figure 7:
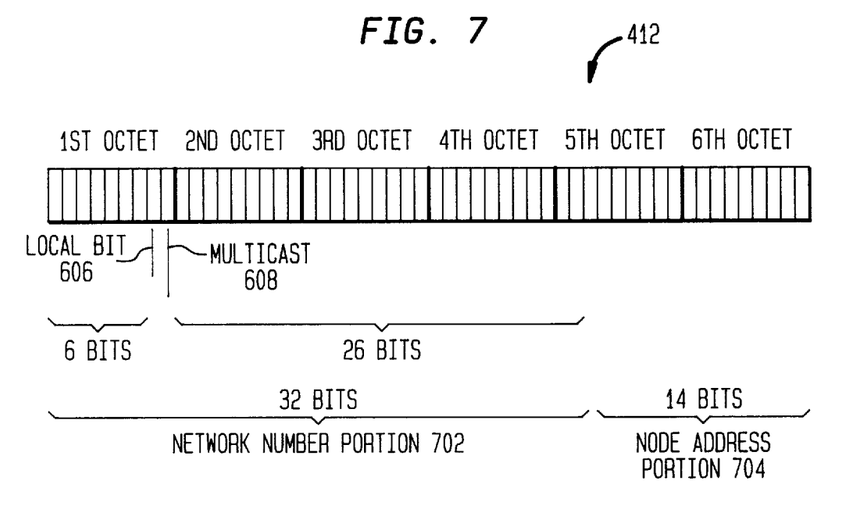
FIG. 7 is a block diagram of a 6-byte source or destination address field of an IPX network layer header configured to store a globally-unique node address created by the address mapping gateway of the present invention.

Referring to FIG. 7, the 6-byte node address field 412 is divided into a network number portion 702 and a node address portion 704. Network number portion 702 consists of 32 of the 34 most significant bits of node address field 412, accommodating the IEEE local and multicast bits. The node address portion 704 is allocated the least significant 14 bits of node address field 412. Since 14 bits rather than 48 bits are allocated to the node address, this approach is based upon the implicit assumption that the locally-assigned node addresses will not have a value that exceeds 16,383.

Thus, the address mapping gateway 336 performs a repeatable mapping operation on the node address, overlaying the 4-byte network number 408 on the 32 of the 34 high order bits of the node address (allowing for the two address type bits). The address mapping gateway sets multicast bit 606 to zero and the global/local bit 608 to one to identify this type of addressing scheme; that is, to indicate that the node address has been locally assigned. The originally-assigned node address remains in the 14 least significant bits. This 48-bit gateway-mapped node address is also placed in the mapped node address field 508 of address mapping table 500.

Upon receipt of a packet destined for the domain network address, the address mapping gateway 336 searches the mapped node address field 508 for the gateway-mapped node address value stored in the destination node address field 410. Upon finding that value, the address mapping gateway retrieves the associated network layer address (network number and node address), performs the address translation, and forwards the packet to the destination node.

There are certain node addresses, such as those assigned to server nodes, that must be made available to the backbone and, therefore, cannot be translated by the address mapping gateway. In the illustrative embodiment, for example, a domain may include file servers with the NetWare Directory Service™ (NDS™) software which embed their network addresses within higher level protocols 236–242.

Figure 8:
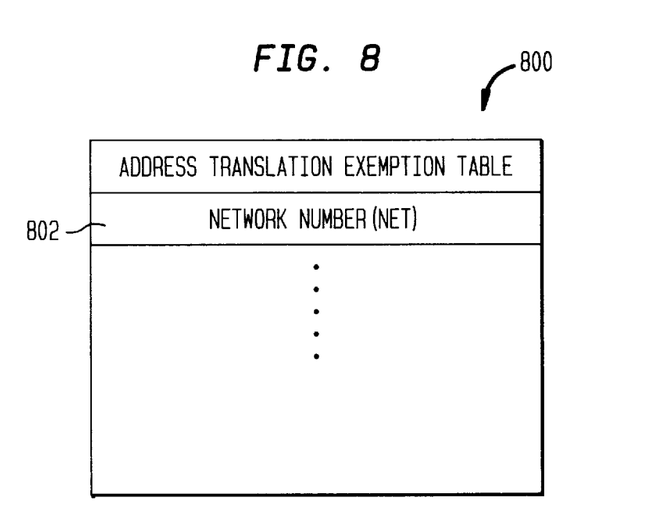
FIG. 8 is a block diagram of the address translation exemption table of the present invention.

Referring to FIG. 8, the address mapping gateway maintains translation exemption table 800, containing the network layer addresses of non-translatable network numbers, such as those assigned to these NDS-advertised services. Rather than advertising that such nodes are accessible via the globally-unique domain network address, the address mapping gateway explicitly advertises these non-translatable network numbers.

Upon receipt of a packet from a source node in an associated domain, the address mapping gateway searches translation exemption table 800 for the network number located in source network number field 408 prior to generating a new address mapping table entry 512. Alternatively, the address mapping table could reference the route filters. In either event, there will be no translation of network numbers that are explicitly advertised; the address mapping gateway simply passes the packet through the implementing router without translation.

For example, if server node 346 on local network 320 is made globally available, the directory services will advertise that the server node has a network layer address 27:Y. Thus, address mapping gateways 312–314 cannot advertise that server node Y has an address of 97:Y (97 being the globally-unique domain network address). Address mapping gateways 306–310 advertise that network number 27 is reachable in addition to network number 97. When a packet having a destination network number 406 with a value of 27 is received, the address mapping gateway will not translate the address, but instead will forward the packet to the server destination node 344.

For a domain accessible through multiple address mapping gateways, each address mapping gateway advertises to the backbone that it can provide access to all nodes having the globally-unique domain network address as the network number. Just as any packet generated by a node in the domain may pass through any of the available address mapping gateways, a packet destined for a node within the domain may also return via any of the available address mapping gateways.

Under such conditions, it is not uncommon that the address mapping gateway through which the node's initial communication traveled is not the same as the address mapping gateway that the return packet passes. If a return packet is received by a domain node via a different address mapping gateway than the one through which the original packet went to the backbone, the receiving address mapping gateway will not have the requisite mapping entry in the cross-reference table. Under such conditions, the packet is normally dropped.

The routers implementing the address mapping gateway of the present invention are provided with a special network address, referred to as an internal network address, that is unique within the domain and transparent to the backbone. All address mapping gateways are provided the internal network addresses of their peers through any commonly known means.

Upon receipt of a packet having the domain network address as the destination network number and a node address for which there is no mapping entry 512 in the address mapping table 500, the address mapping gateway concludes that the packet must have been sent in response to a communication transferred through another address mapping gateway. Thus, the receiving address mapping gateway forwards the packet to the internal network address of all the other address mapping gateways.

In the event an address mapping gateway receives a packet through its internal network address having a node address for which it does not have a mapping entry, the address mapping gateway discards the packet under the assumption that another address mapping gateway will have the associated mapping entry in its address mapping table. However, in the event a packet is received through the address mapping gateway's internal network address and a mapping entry is found for the node address, then the address mapping gateway performs the above-noted address translations and forwards the packet to the destination node.

The receipt of a packet having the internal network address indicates to the address mapping gateway that the source address mapping gateway does not have the mapping entry for the node address contained in the packet. As a result, the address mapping gateway that contained the mapping entry for the node address provides the mapping information to the source address mapping gateway using a particular message, referred to as a mapping entry update message.

In the illustrative embodiment, the address mapping gateway adds a header into the packet containing the destination node address information. This additional header may make the packet too large for the particular network. Under such circumstances, the address mapping gateway splits the packet into separate messages.

For example, referring to FIG. 3, if source node 342 generates a packet destined for the backbone through address mapping gateway 310, that gateway will create a mapping entry 512 in the address mapping table 500 for the node address X and the network number 25, and forward the packet to the backbone with the source network layer address 87:Z, as described above. When a return packet destined for node 342 is received by, for example, address mapping gateway 308, no such mapping entry for node address Z will be found in its address mapping table 500.

Address mapping gateway 308 then forwards the packet to gateways 306 and 310, replacing the domain network address in the network address number field 402 with the internal network address 51:A and the gateway-mapped node address in one message and 75:C in another. Address mapping gateway 308 will then discard the packet. Address mapping gateway 306 will discard the packet since it does not have a mapping entry for a node address of Z. However, gateway 310 does have such an entry and, upon receipt, will replace its internal network address of 75:C in the network address field 402 with the network number 25 of the local network 318 and the node address X of node 342, and forward the packet to destination node 342. Gateway 310 also sends a mapping entry update message to gateway 308, providing it with the association of network address 25:X to the gateway-mapped node address Z. The gateway 308 then updates its address mapping table 500 accordingly.

It should be understood that embodiments of the present invention can be implemented in hardware, software or a combination thereof. In such functional components, the steps they perform would be implemented in hardware and/or software to perform the functions of the present invention. Furthermore, the present invention may be implemented in a standardized software program stored in any type of computer-readable medium. Any presently available or future developed computer software language can be employed in such embodiments of the present invention. Furthermore, the present invention may be implemented in dedicated circuits of conventional design with those skilled in the art. Any presently available or future developed circuitry can be employed in such embodiments of the present invention.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An address mapping gateway for use in an internetwork link, for representing substantially all nodes in a domain as being associated with a domain network address, comprising:

means for receiving a first packet from a source node within the domain, said first packet having a network layer header including a network layer address, said network layer address comprising a node address and a network number of a local network including said source node;

means for generating a gateway-mapped node address that is unique within the domain;

an address mapping table having one or more mapping entries, each said mapping entry associated with a node within the domain and including said node address, said network number, and said gateway-mapped node address;

means for creating said mapping entries in said address mapping table;

first translation means for substituting the domain network address in place of said network number and for substituting said gateway-mapped node address in place of said node address in a packet generated by a node in the domain;

means for receiving a second packet for a destination node in the domain, said second packet having a network layer header including a network layer address, said network layer address comprising said gateway-mapped node address and said domain network address; and second translation means for substituting said network number and said node address in place of said domain network address and said gateway-mapped node address, respectively, of said second packet.

2. In an internetwork having two or more local networks interconnected by one or more internetwork links, a method for addressing nodes in an internetwork link, said method comprising the steps of:

(a) generating a domain network address to represent substantially all the nodes in a domain, wherein said domain network address is a unique network number within the internetwork;

(b) receiving a packet generated by a source node within said domain, said packet including a source node address header field having a source network number of a local network including said source node, and a source node address of said source node;

(c) generating a gateway-mapped node address for said source node, wherein said gateway-mapped node address is unique within said domain, said step of generating comprising the steps of (1) determining whether said source node address is unique within said domain;

(2) assigning a first value to said gateway-mapped node address equivalent to said source node address when said source node address is unique within said domain;

(3) assigning a second value to said gateway-mapped node address when said source node address is not unique within said domain, wherein said second value is a node address value unique within said domain; and (d) substituting said domain network address and said gateway-mapped node address in place of said source network number and said source node address, respectively, in said source node address header field.

3. In an internetwork link of an internetwork, a method for representing substantially all nodes in a domain as being associated with a single network number, the method comprising the steps of:

(a) receiving a packet from a first node within the domain, said packet having a network layer header with a first network layer address, said network layer address including a network number of a local network in which said first node resides, and an originally-assigned node address of said first node;

(b) translating said first network layer address to a second network layer address, wherein said second network layer address is unique within the internetwork, and said step of translating includes the steps of (1) generating a domain network number of said second network layer address, wherein said domain network number is unique within the internetwork;

(2) generating a gateway-mapped node address of said second network layer address, wherein said gateway-mapped node address is unique within the domain, and comprising the steps of a) determining whether said node address is unique within the internetwork;

b) setting said gateway-mapped node address to said node address when said node address is a unique node address;

c) combining said network number of said local network and said originally-assigned node address to create a domain-unique gateway-mapped node address value when said node address is not unique within the domain; and (3) replacing said first network layer address with said second network layer address in said network layer header of said packet.

4. An address mapping gateway for associating substantially all nodes in a domain with a domain network address, comprising:

means for receiving a packet from a first node within the domain, said packet having a network layer header including a network layer address, said network layer address comprising a node address of said first node and a network number of a local network including said first node;

means for providing a gateway-mapped node address for said first node, wherein said gateway-mapped node address is unique within the domain, and said means for providing includes a) means for determining whether said node address is unique within the domain;

b) means for assigning a first value to said gateway-mapped node address equal to said node address when said node address is unique within the domain, and for assigning a second value to said gateway-mapped node address that is unique within the domain when said node address is not unique within the domain;

means for substituting the domain network address for said network number and for substituting said gateway-mapped node address for said node address in said packet;

means for receiving a second packet, destined for said first node, said second packet having a second network layer header with a second network layer address, said second network layer address including said domain network address identifying said local network including said first node and said gateway-mapped node address to identify said first node; and means for substituting said network number and said node address in place of said domain network address and said gateway-mapped node address of said second packet, respectively.

5. The address mapping gateway of claim 4, wherein the domain is accessible through a plurality of internetwork links each having an address mapping gateway, wherein each said address mapping gateway comprises:

means for forwarding a packet to other of said plurality of address mapping gateways when said address mapping gateway does not have a mapping entry associated with a destination node identified by a network layer address of said packet; and means for providing one or more other address mapping gateways with a mapping entry from said address mapping table.

6. In an internetwork having two or more domains interconnected by one or more internetwork links, a method for addressing nodes in an internetwork link to a domain which comprises a plurality of local networks, comprising the steps of:

(a) generating a domain network address to represent substantially all the nodes in the domain, wherein said domain network address is a unique network number within the internetwork;

(b) receiving a packet generated by a source node within said domain, said packet including a source node address header field having a source network number of a local network including said source node, and a source node address of said source node;

(c) referencing a translation exemption table containing non-translatable network numbers and performing steps (d) and (e) when said translation exemption table does not contain said source network number;

(d) generating a gateway-mapped node address for said source node, wherein said gateway-mapped node address is unique within said domain;

(e) substituting said domain network address and said gateway-mapped node address in place of said source network number and said source node address, respectively, in said source node address header field;

(f) creating a mapping entry into an address mapping table having one or more mapping entries, said mapping entry associated with said source node and including a node address field for storing said source node address, a network number field for storing said source network number, and a mapped node address field for storing said gateway-mapped node address.

7. The method of claim 6, further comprising the steps of:

(a) receiving a packet for a destination node in said domain, said packet having a destination node address header field including said domain network address and said gateway-mapped node address; and (b) substituting a destination network number of a second local network within said domain and a destination node address of a node within said second local network in place of said domain network address and said gateway-mapped node address, respectively.

8. The method of claim 6 further comprising the step of advertising said non-translatable network numbers into the internetwork.

9. The method of claim 6 further comprising the steps of:

(a) receiving, at a first internetwork link of said one or more internetwork links, a packet for a destination node in said domain, said packet having a destination node address header having a network number equivalent to said domain network address, and a destination node address not equivalent to a gateway-mapped node address in a first address mapping table of said first internetwork link;

(b) forwarding said packet to a second internetwork link of said plurality of internetwork links;

(c) searching gateway-mapped node addresses in a second address mapping table in said second internetwork link for a value equivalent to said destination node address;

(d) retrieving from said second address mapping table, a network number of a local network and a node address of said destination node; and (e) substituting, by said second internetwork link, said network number and said node address in place of said domain network address and said destination node address, respectively, in said packet.

10. The method of claim 9 further comprising the step of providing, by said second internetwork link, said source network number and said source node address to said first internetwork link.

11. In an internetwork link of an internetwork, a method for representing substantially all nodes in a domain as being associated with a single network number, the method comprising the steps of:

(a) receiving a packet from a first node within the domain, said packet having a network layer header with a first network layer address, said network layer address including a network number of a local network in which said first node resides, and an originally-assigned node address of said first node;

(b) translating said first network layer address to a second network layer address, wherein said second network layer address is unique within the internetwork, and wherein the step of translating further comprises the steps of:
  (i) generating a domain network number of said second network layer address, wherein said domain network number is unique within the internetwork;
  (ii) generating a gateway-mapped node address of said second network layer address, wherein said gateway-mapped node address is unique within the domain; and
  (iii) replacing said first network layer address with said second network layer address in said network layer header of said packet;

(c) receiving a second packet, said second packet having a second network layer header with a second network layer address, said second network layer address including a network number portion having a value equivalent to said domain network number, and a node address portion having a value equivalent to said gateway-mapped node address;

(d) substituting said first network number and said node address in place of said domain network address and said gateway-mapped node address, respectively, to translate said second network layer address to said first network layer address;

(e) referencing a translation exemption table containing non-translatable network numbers; and (f) performing said step (b) when said translation exemption table does not contain said network number of said local network.

12. The method of claim 11, further comprising the step of:
  (g) advertising said non-translatable network numbers and said domain network number into the internetwork.

13. An address mapping gateway for associating substantially all nodes in a domain with a domain network address, the address mapping gateway comprising:

(a) means for receiving a packet from a first node within the domain, said packet having a network layer header including a network layer address, said network layer address comprising a node address of said first node and a network number of a local network including said first node;

(b) means for providing a gateway-mapped node address for said first node, wherein said gateway-mapped node address is unique within the domain;

(c) means for substituting the domain network address for said network number and for substituting said gateway-mapped node address for said node address in said packet;

(d) means for receiving a second packet, destined for said first node, said second packet having a second network layer header with a second network layer address, said second network layer address including said domain network address identifying said local network including said first node and said gateway-mapped node address to identify said first node;

(e) means for substituting said network number and said node address in place of said domain network address and said gateway-mapped node address of said second packet, respectively; and (f) an address mapping table configured to store one or more mapping entries, each said mapping entry associated with a node within the domain, said one or more mapping entries including a first node mapping entry including:
  (i) said node address of said first node,
  (ii) said network number of said local network in which said first node resides, and
  (iii) said gateway-mapped node address;

(g) means for creating said mapping entries in said address mapping table; and (h) a translation exemption table containing non-translatable network numbers, wherein said address mapping gateway does not translate network layer addresses containing said non-translatable network numbers.

14. The address mapping gateway of claim 13, wherein said address mapping gateway advertises network layer addresses having said non-translatable network numbers, and said domain network address, into the internetwork.

* * * * *